United States Patent
Han et al.

(10) Patent No.: US 12,291,077 B2
(45) Date of Patent: May 6, 2025

(54) AIR-CONDITIONING DEVICE AND SYSTEM HAVING AN INTEGRATED HEAT EXCHANGER

(71) Applicants: HYUNDAI MOTOR COMPANY, Seoul (KR); KIA CORPORATION, Seoul (KR); DOOWON CLIMATE CONTROL CO., LTD, Asan-si (KR)

(72) Inventors: Kwang Ok Han, Seoul (KR); Gee Young Shin, Suwon-si (KR); Su Yeon Kang, Seoul (KR); Dong Ho Kwon, Yongin-si (KR); Myung Hoe Kim, Seoul (KR); Dae Hee Lee, Incheon (KR); Jae Won Cha, Pyeongtaek-si (KR); Won Jun Joung, Uiwang-si (KR); Byung Guk An, Asan-si (KR)

(73) Assignees: HYUNDAI MOTOR COMPANY, Seoul (KR); KIA CORPORATION, Seoul (KR); DOOWON CLIMATE CONTROL CO., LTD, Asan (KR)

( * ) Notice: Subject to any disclaimer, the term of this patent is extended or adjusted under 35 U.S.C. 154(b) by 199 days.

(21) Appl. No.: 17/988,414

(22) Filed: Nov. 16, 2022

(65) Prior Publication Data
US 2023/0398829 A1 Dec. 14, 2023

(30) Foreign Application Priority Data
Jun. 13, 2022 (KR) .......... 10-2022-0071607

(51) Int. Cl.
*B60H 1/00* (2006.01)

(52) U.S. Cl.
CPC ..... *B60H 1/00064* (2013.01); *B60H 1/00842* (2013.01); *B60H 1/00885* (2013.01); *B60H 2001/00092* (2013.01)

(58) Field of Classification Search
CPC ............ B60H 1/00064; B60H 1/00842; B60H 1/00885; B60H 2001/00092;
(Continued)

(56) References Cited

U.S. PATENT DOCUMENTS 5,975,191 A * 11/1999 Ohashi ............... B60H 1/00035
62/325
6,311,763 B1 * 11/2001 Uemura ................ B60H 1/247
62/244
(Continued)

FOREIGN PATENT DOCUMENTS

GB 2364000 A * 1/2002 ......... B01D 46/0006
JP 2020040499 A 3/2020
(Continued)

*Primary Examiner* — Len Tran
*Assistant Examiner* — Gustavo A Hincapie Serna
(74) *Attorney, Agent, or Firm* — Lempia Summerfield Katz LLC

(57) ABSTRACT

The present disclosure provides an air-conditioning device and an air-conditioning system of an integrated heat exchanger, wherein an integrated heat exchanger for generating heating air or cooling air is used to generate air-conditioning air by utilizing cooling water, thereby securing cooling/heating efficiency. A decreased number of doors are used to adjust the temperature of air-conditioning air with regard to each mode, thus reducing the entire package. In addition, front and rear indoor spaces can be temperature-controlled individually, and comfort can be provided for each passenger seat.

9 Claims, 14 Drawing Sheets

(58) Field of Classification Search
CPC ........ B60H 2001/00157; B60H 1/0005; B60H 1/00328; B60H 1/32284; B60H 1/00521; B60H 1/00021; B60H 1/00542; B60H 1/00592; B60H 1/00671; B60H 1/00735; B60H 1/2225; B60Y 2301/01
USPC .......................................................... 165/59
See application file for complete search history.

(56) References Cited

U.S. PATENT DOCUMENTS

| | | | | |
|---|---|---|---|---|
| 10,160,284 B2 * | 12/2018 | Park | .................. | B60H 1/00021 |
| 10,202,017 B2 * | 2/2019 | Chiba | .................. | F28D 1/05375 |
| 11,267,311 B2 * | 3/2022 | Suzuki | .................. | B60H 1/00064 |
| 2003/0056529 A1 * | 3/2003 | Kakehashi | .......... | B60H 1/00978 |
| | | | | 62/186 |
| 2003/0205370 A1 * | 11/2003 | Kim | .................. | B60H 1/00064 |
| | | | | 165/203 |
| 2006/0175050 A1 * | 8/2006 | Kang | .................. | B60H 1/00064 |
| | | | | 165/203 |
| 2006/0260783 A1 * | 11/2006 | Park | .................. | B60H 1/00471 |
| | | | | 62/244 |
| 2007/0137833 A1 * | 6/2007 | Kang | .................. | B60H 1/00064 |
| | | | | 165/42 |
| 2009/0117841 A1 * | 5/2009 | Goto | .................. | B60H 1/00064 |
| | | | | 454/127 |
| 2011/0005716 A1 * | 1/2011 | Katsuki | .............. | B60H 1/00064 |
| | | | | 165/61 |
| 2011/0016896 A1 * | 1/2011 | Oomura | .................. | B60H 1/321 |
| | | | | 392/347 |
| 2013/0008627 A1 * | 1/2013 | Uemura | ............. | B60H 1/00692 |
| | | | | 165/96 |
| 2015/0099452 A1 * | 4/2015 | Mazzocco | .......... | B60H 1/00678 |
| | | | | 454/160 |
| 2015/0107815 A1 * | 4/2015 | Hhraguchi | ......... | B60H 1/00028 |
| | | | | 165/202 |
| 2015/0158365 A1 * | 6/2015 | Hashimoto | ........ | B60H 1/00007 |
| | | | | 165/41 |
| 2016/0303941 A1 * | 10/2016 | Kinmartin | .......... | B60H 1/00064 |
| 2016/0361965 A1 * | 12/2016 | Watanabe | .......... | B60H 1/00328 |
| 2017/0087956 A1 * | 3/2017 | Graaf | ................. | B60H 1/00921 |
| 2017/0129309 A1 * | 5/2017 | Lee | .......................... | F25B 6/02 |
| 2017/0217278 A1 * | 8/2017 | Richter | .................. | B60H 3/024 |
| 2018/0029442 A1 * | 2/2018 | Inui | ...................... | G05D 23/1919 |
| 2018/0162190 A1 * | 6/2018 | Hensler | .............. | B60H 1/00842 |
| 2019/0359026 A1 * | 11/2019 | Salazar | .............. | B60H 1/3233 |
| 2020/0114723 A1 * | 4/2020 | Tani | .................. | B60H 1/00842 |
| 2021/0001682 A1 * | 1/2021 | Schnaidt | .............. | B60H 1/00564 |
| 2021/0094391 A1 * | 4/2021 | Miyakoshi | ......... | B60H 1/00485 |
| 2021/0101439 A1 | 4/2021 | Hayes et al. | | |
| 2021/0213799 A1 * | 7/2021 | Zhang | ................. | B60H 1/00207 |
| 2022/0074636 A1 * | 3/2022 | Nishida | .................. | F25B 47/02 |

FOREIGN PATENT DOCUMENTS

| | | |
|---|---|---|
| KR | 20080092527 A | 10/2008 |
| KR | 101469755 B1 | 12/2014 |
| WO | WO-2021192374 A1 * | 9/2021 |

* cited by examiner

AIR-CONDITIONING DEVICE AND SYSTEM HAVING AN INTEGRATED HEAT EXCHANGER

CROSS-REFERENCE TO RELATED APPLICATION(S)

This application is based on and claims priority under U.S.C. 119 to Korean Patent Application No. 10-2022-0071607, filed on Jun. 13, 2022, in the Korean Intellectual Property Office, the disclosure of which is herein incorporated by reference in its entirety.

BACKGROUND

1. Technical Field

The present disclosure relates to an air-conditioning device and an air-conditioning system of an integrated heat exchanger and, more particularly, to an air-conditioning device and an air-conditioning system of an integrated heat exchanger, wherein an integrated heat exchanger is applied to secure cooling/heating efficiency utilizing cooling water, and wherein a decreased number of doors are used to adjust the temperature of air-conditioning air with regard to each mode, such that the entire package (size, number of components, weight, and the like) is reduced.

2. Description of the Prior Art

Recently, electric cars have been considered to implement eco-friendly technologies and to solve social problems such as energy deletion. Electric cars operate by using motors that receive electricity from batteries and then output power. Therefore, electric cars emit no carbon dioxide and generate little noise, and the energy efficiency of motors are higher than that of engines. As a result, electric cars are considered eco-friendly.

Core technologies in connection with implementing such electric cars are related to battery modules, and there has recently been active research regarding lightweight and compact batteries and shorter charging times. Battery modules can maintain optical performances and long lifespans only when used in optical temperature environments. However, heat generated during driving and external temperature changes make it difficult to use them in optical temperature environments.

In addition, electric cars have no waste heat sources generated during combustion by separate engines as in the case of internal combustion engines, and use electric heating devices for indoor heating during winter. In addition, warmup is necessary to improve the battery charging/discharging performance at extremely low temperatures, and configure and use separate cooling water heating-type electric heaters, respectively. In other words, cooling/heating systems for battery module temperature adjustment is used separately from cooling/heating systems for indoor air conditioning in order to maintain optical temperature environments for battery modules.

In the case of air-conditioning systems for indoor air conditioning, heat pump technology for minimizing energy consumption is applied to increase driving distance, thereby minimizing the amount of consumed energy. The air-conditioning systems have a temperature adjustment door for selectively adjusting supply of cooling air and heating air, and have respective components for an evaporator and a heater spaced from each other, thereby increasing the overall size. In addition, during air conditioning solely by circulating a refrigerant, respective components for refrigerant circulation have increased capacities, thereby increasing the overall package size and weight.

The above descriptions regarding background technologies have been made only to help understanding of the background of the present disclosure, and are not to be deemed by those having ordinary skill in the art to correspond to already-known prior arts.

SUMMARY

The present disclosure has been proposed to solve the above-mentioned problems. It is an aspect of the present disclosure to provide an air-conditioning device and an air-conditioning system of an integrated heat exchanger, wherein an integrated heat exchanger is applied to secure cooling/heating efficiency utilizing cooling water, and wherein a decreased number of doors are used to adjust the temperature of air-conditioning air with regard to each mode, such that the entire package (size, number of components, weight, and the like) is reduced.

In accordance with an aspect of the present disclosure, an air-conditioning device of an integrated heat exchanger includes: a housing including a plurality of air outlets and an air inlet through which air circulates; an indoor heat exchanger provided inside the housing and including a first heat exchange unit and a second heat exchange unit for heat exchange between a cooling medium and air via circulation of the cooling medium, the first heat exchange unit and the second heat exchange unit being arranged on upper and lower sides, respectively, of the housing, and configured such that a temperature of the air can be adjusted to an identical temperature or different temperatures; and a heater arranged inside the housing to be spaced apart from the indoor heat exchanger to increase the temperature of the circulating air according to whether or not the heater operates.

The air outlet of the housing may include at least one defrost vent hole and a front vent hole on the upper side of the housing, and at least one rear vent hole on the lower side thereof, wherein the vent holes may include a defrost door, a front door, and a rear door.

The front vent hole may be divided into an indoor upper vent hole and an indoor lower vent hole, and the defrost door may regulate the air flow between the defrost vent hole and the indoor upper vent hole such that the defrost vent hole and the indoor upper vent hole are arranged adjacent to each other in the housing, and wherein the front door regulates the air flow between the indoor upper vent hole and the indoor lower vent hole.

The front door may be configured such that opposite ends thereof are partially cut, and when being positioned to close the indoor upper vent hole, a part of air (i.e., some air) may flow through the cut portion.

The defrost door may be configured such that opposite ends thereof are partially cut, and when being positioned to close a front vent hole side, a part of air (i.e., some air) may flow through the cut portion.

The rear door may be disposed at a rear of the heater, and when being positioned to open a rear vent hole side, may be configured such that a part or some of the air that has passed through the heater is guided to the rear vent hole side.

A bypass flow path may be formed on an upper side of the heater in the housing so that a part or some of the air that has passed through the indoor heat exchanger does not pass through the heater through the bypass flow path.

A bypass door may be installed at the bypass flow path in the housing, and air flow through the bypass flow path may be selectively allowed depending on whether the bypass door is opened or closed.

The bypass door may be closed when forming heating air via the indoor heat exchanger, may be opened when forming cooling air via the indoor heat exchanger, and may be closed when the defrost vent hole and the front vent hole are closed and the rear vent hole is opened.

The heater may include a first heating unit and a second heating unit which operate individually, wherein the first heating unit is positioned to be matched with the first heat exchange unit and the second heating unit is positioned to be matched with the second heat exchange unit.

In accordance with an aspect of the present disclosure, an air-conditioning system of an integrated heat exchanger includes: a refrigerant circuit through which a refrigerant circulates and which includes a compressor, a condenser, an expander, and an evaporator; a first cooling water circuit in which cooling water for heating, which exchanges heat with the condenser of the refrigerant circuit, circulates; a second cooling water circuit in which cooling water for cooling, which exchanges heat with the evaporator of the refrigerant circuit, circulates; an indoor heat exchanger provided inside the housing and including a first heat exchange unit and a second heat exchange unit to which the first cooling water circuit and the second cooling water circuit are connected so that the cooling water for heating and the cooling water for cooling are selectively circulated, wherein the first heat exchange unit and the second heat exchange unit are arranged on upper and lower sides, respectively, of the housing, and identical cooling water or different cooling waters circulates therethrough so that a temperature of air is adjusted separately for the first heat exchange unit and the second heat exchange unit; and a valve module to which the first cooling water circuit and the second cooling water circuit are connected and which selectively regulates the cooling water for heating or the cooling water for cooling which circulates to the indoor heat exchanger.

The first cooling water circuit may include a first water pump and an outdoor heat exchanger, and the second cooling water circuit may include a second water pump.

The first cooling water circuit and the second cooling water circuit may selectively share respective cooling water via a plurality of shared valves.

An air outlet of the housing may include at least one defrost vent hole and a front vent hole on the upper side of the housing, and at least one rear vent hole on the lower side thereof, wherein the vent holes may include a defrost door, a front door, and a rear door.

In the housing, a bypass flow path may be formed on an upper side of the heater, and a bypass door may be installed at the bypass flow path.

The air-conditioning system may further include: a controller configured to control the valve module and each door according to a temperature condition required in an indoor space.

When cooling an indoor front space and an indoor rear space, the controller may control the valve module and each door so that the cooling water for cooling, which circulates to the second cooling water circuit, circulates to the first heat exchanger and the second heat exchanger, and the front door, the rear door, and the bypass door are opened.

When cooling an indoor front space and heating an indoor rear space, the controller may control the valve module and each door so that the cooling water for heating of the first cooling water circuit circulates to the second heat exchange unit, the cooling water for cooling of the second cooling water circuit circulates to the first heat exchanger, and the front door, the rear door, and the bypass door are opened.

When heating an indoor front space and cooling an indoor rear space, the controller may control the valve module and each door so that the cooling water for heating of the first cooling water circuit circulates to the first heat exchange unit, the cooling water for cooling of the second cooling water circuit circulates to the second heat exchanger, and the front door, the rear door, and the bypass door are opened.

When heating an indoor front space and an indoor rear space, the controller may control the valve module and each door so that the cooling water for heating, which circulates in the first cooling water circuit, circulates to the first heat exchange unit and the second heat exchange unit, the heater is selectively operated, and the front door and the rear door are opened and the bypass door is closed.

When defrosting, the controller may control the valve module and each door so that the cooling water for heating, which circulates in the first cooling water circuit, circulates to the first heat exchange unit and the second heat exchange unit, the heater is selectively operated, the defrost door is opened, and the front door, the rear door, and the bypass door are closed.

According to the air-conditioning device and the air-conditioning system of an integrated heat exchanger having the above-mentioned structure, an integrated heat exchanger for generating heating air or cooling air is used to generate air-conditioning air by utilizing cooling water, thereby securing cooling/heating efficiency, and wherein a decreased number of doors are used to adjust the temperature of air-conditioning air with regard to each mode, such that the entire package (size, number of components, weight, and the like) is reduced. In addition, front and rear indoor spaces can be temperature-controlled individually, and comfort can be provided for each passenger seat.

BRIEF DESCRIPTION OF THE DRAWINGS

The above and other aspects, features, and advantages of the present disclosure should be more apparent from the following detailed description taken in conjunction with the accompanying drawings, in which.

DETAILED DESCRIPTION

Figure 1:
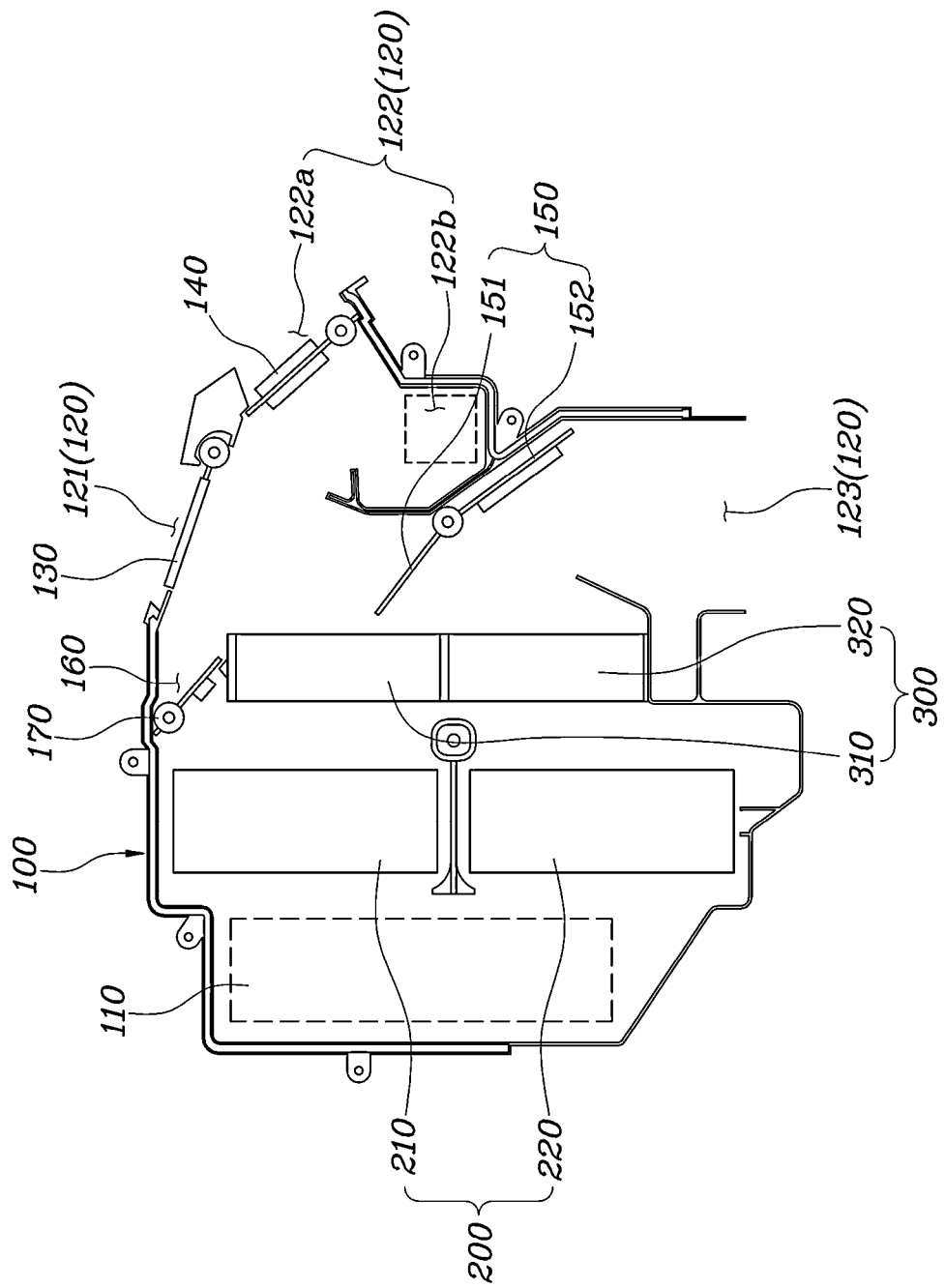
FIG. 1 is a view illustrating an air-conditioning device of an integrated heat exchanger according to an embodiment of the present disclosure.

Hereinafter, embodiments disclosed in the present specification are described in detail with reference to the accompanying drawings, and the same or similar elements are given the same and similar reference numerals, so duplicate descriptions thereof are omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, that detailed description may be omitted. Further, the accompanying drawings are provided only for easy understanding of the embodiments disclosed in the present specification, and the technical spirit disclosed herein is not limited to the accompanying drawings. It should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

When an element is referred to as being "connected" or "coupled" to any other element, it should be understood that another element may be provided therebetween, as well as that the element may be directly connected or coupled to the other element. In contrast, when an element is "directly connected" or "directly coupled" to any other element, it should be understood that no other element is present therebetween.

A singular expression may include a plural expression unless they are definitely different in the context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

When a component, device, element, or the like of the present disclosure is described as having a purpose or performing an operation, function, or the like, the component, device, or element should be considered herein as being "configured to" meet that purpose or to perform that operation or function.

A controller may include a communication device that communicates with other controllers or sensors in order to control functions in charge, a memory that stores an operating system or logic instructions, input/output information, and the like, and one or more processors that perform determinations, computations, decisions, and the like.

The drawings according to the present disclosure are as described below.

FIG. 1 is a view illustrating an air-conditioning device of an integrated heat exchanger according to an embodiment of the present disclosure.

Figure 2:
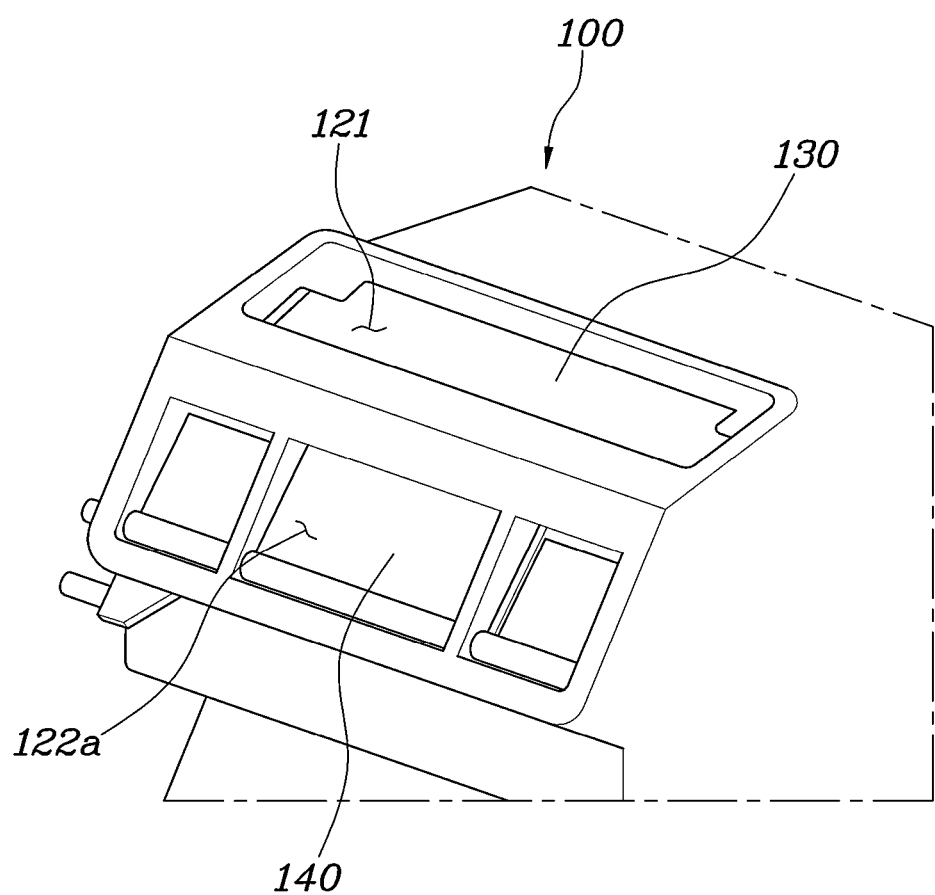
FIG. 2 is a view illustrating a housing and a front door according to an embodiment of the present disclosure.
Figure 3:
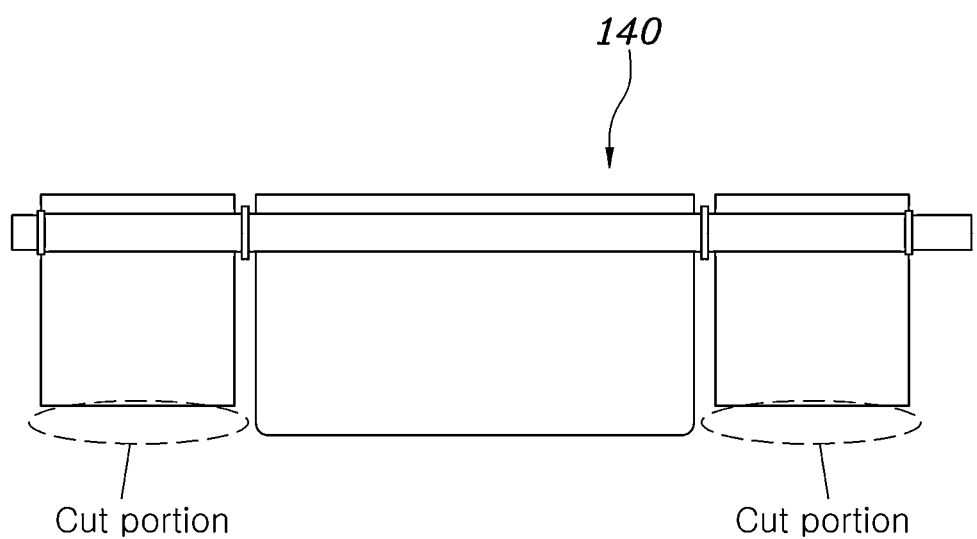
FIG. 3 is a view illustrating a front door according to an embodiment of the present disclosure.
Figure 4:
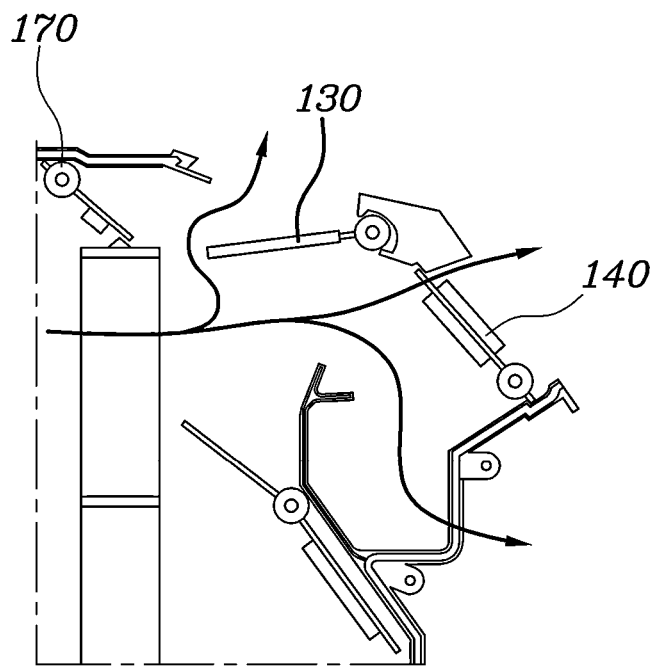
FIG. 4 is a view illustrating an air flow depending on the positions of a defrost door and a front door in an air-conditioning device of an integrated heat exchanger according to an embodiment of the present disclosure.
Figure 5:
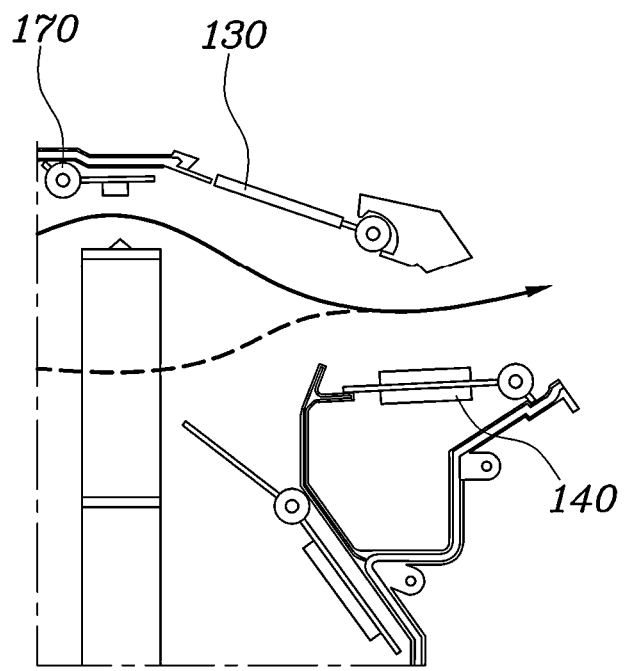
FIG. 5 is a view illustrating an air flow depending on the positions of a defrost door and a front door in an air-conditioning device of an integrated heat exchanger according to an embodiment of the present disclosure.

In addition, FIG. 2 is a view illustrating a housing and a front door according to an embodiment of the present disclosure, FIG. 3 is a view illustrating a front door according to an embodiment of the present disclosure, FIG. 4 is a view illustrating an air flow depending on the positions of a defrost door and a front door in an air-conditioning device of an integrated heat exchanger according to an embodiment of the present disclosure, and FIG. 5 is a view illustrating an air flow depending on the positions of a defrost door and a front door in an air-conditioning device of an integrated heat exchanger according to an embodiment of the present disclosure.

Figure 6:
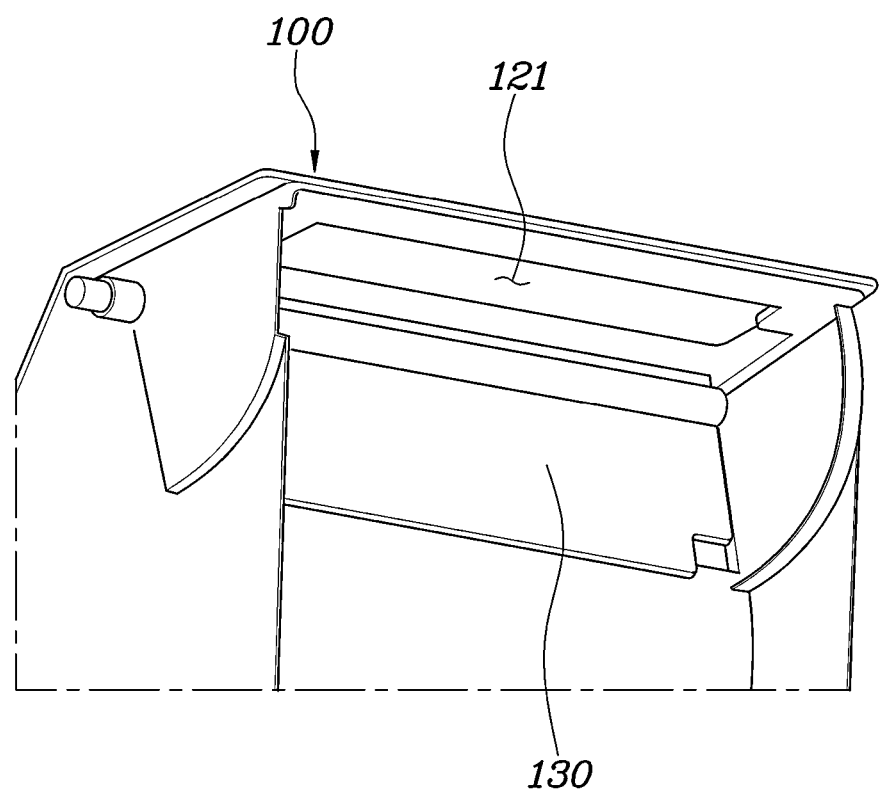
FIG. 6 is a view illustrating a housing and a defrost door according to an embodiment of the present disclosure.
Figure 7:
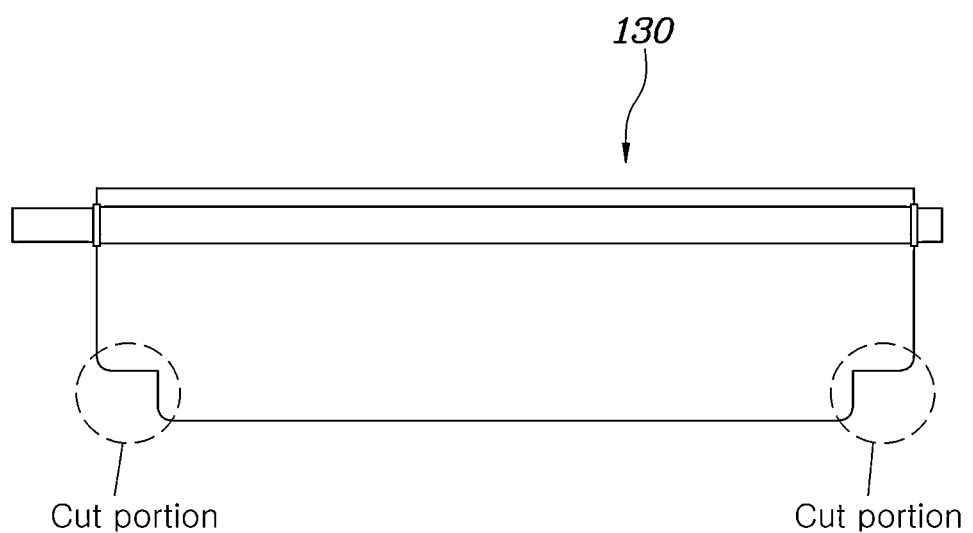
FIG. 7 is a view illustrating a defrost door according to an embodiment of the present disclosure.
Figure 8:
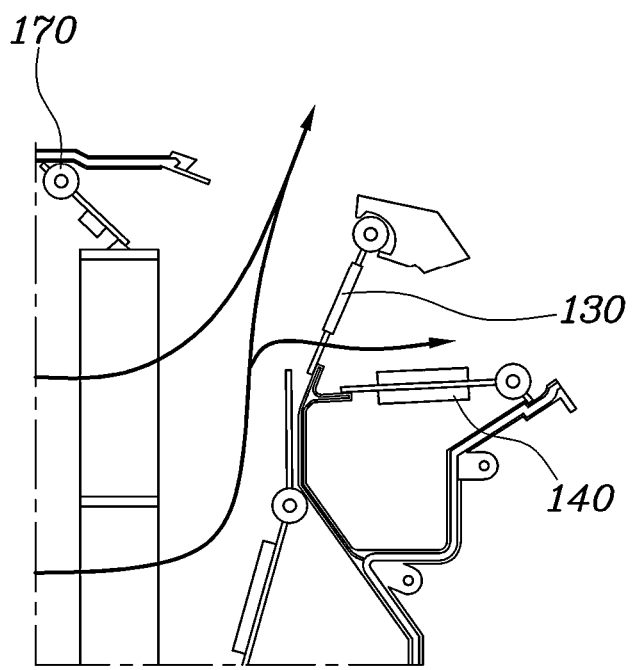
FIG. 8 is a view illustrating an air flow depending on the positions of a defrost door and a front door in an air-conditioning device of an integrated heat exchanger according to an embodiment of the present disclosure.

In addition, FIG. 6 is a view illustrating a housing and a defrost door according to an embodiment of the present disclosure, FIG. 7 is a view illustrating a defrost door according to an embodiment of the present disclosure, and FIG. 8 is a view illustrating an air flow depending on the positions of a defrost door and a front door in an air-conditioning device of an integrated heat exchanger according to an embodiment of the present disclosure.

Figure 9:
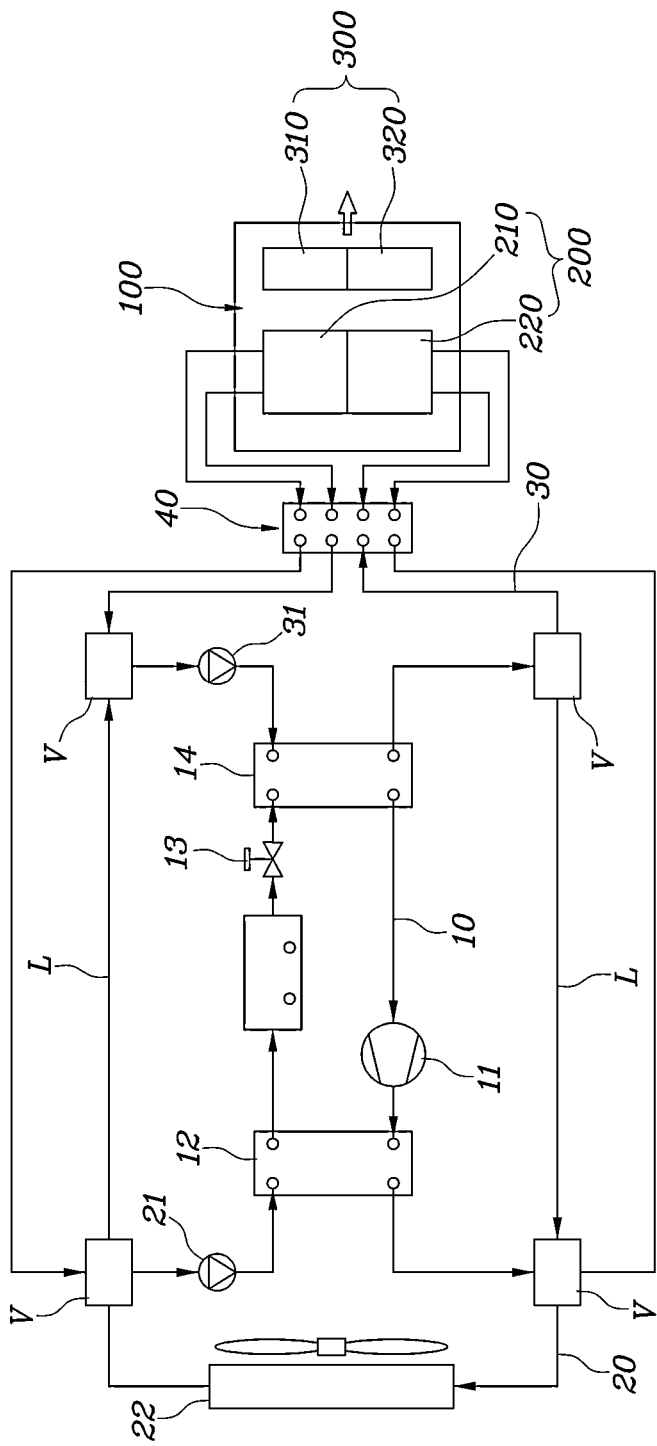
FIG. 9 is a view illustrating a configuration of an air-conditioning system of a heat exchanger according to an embodiment of the present disclosure.
Figure 10:
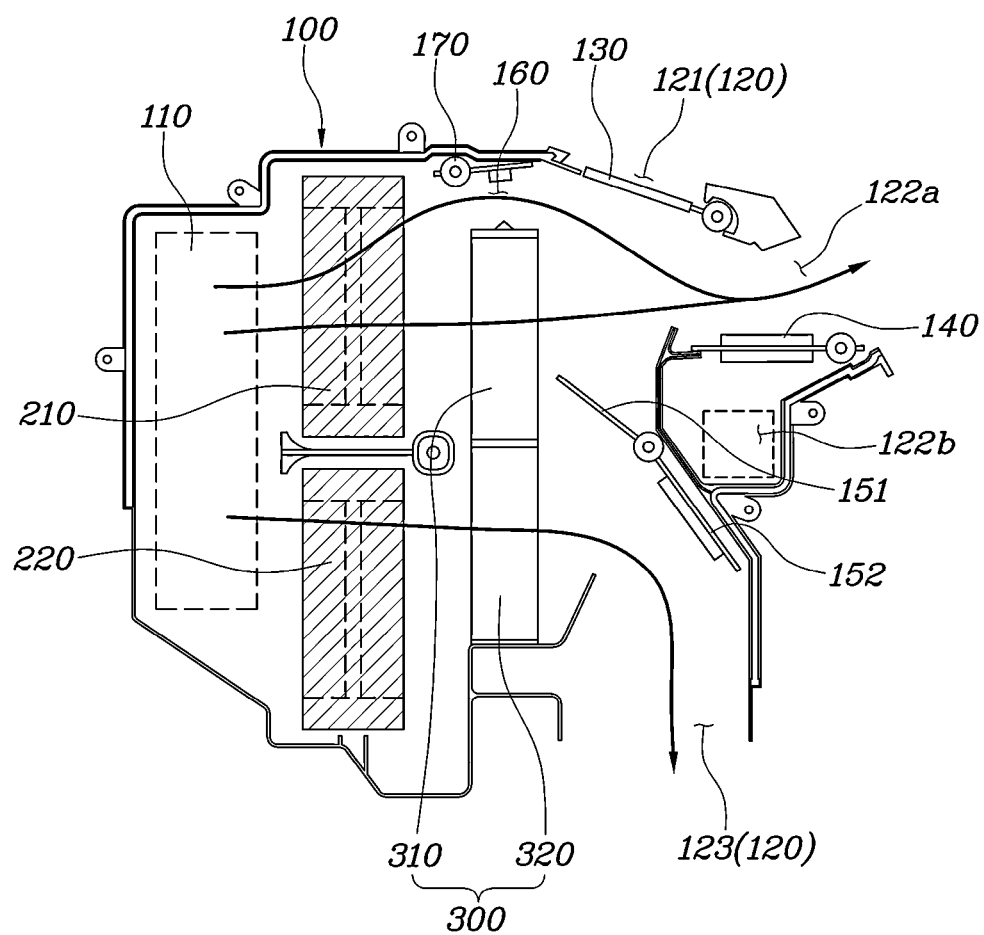
FIG. 10 is a view illustrating the cooling of an indoor front space and an indoor rear space according to an embodiment of the present disclosure.
Figure 11:
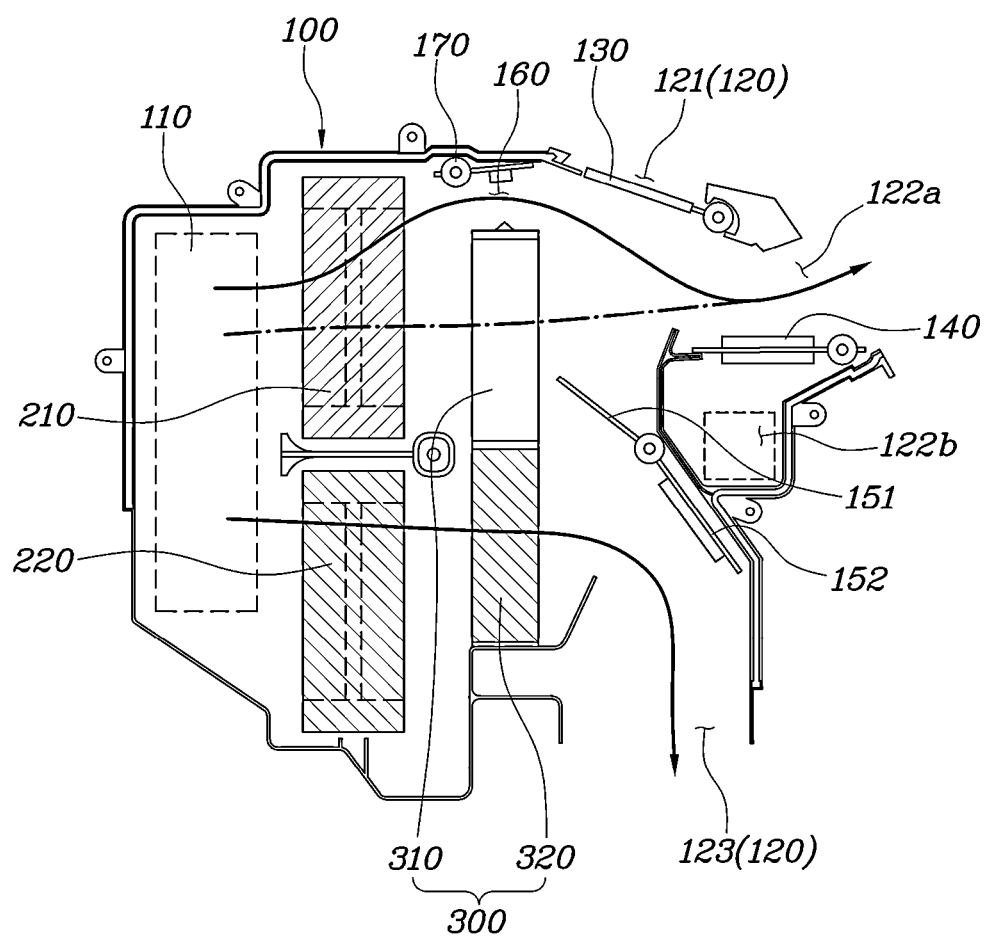
FIG. 11 is a view illustrating the cooling in a case of an indoor front space and the heating in a case of an indoor rear space according to an embodiment of the present disclosure.
Figure 12:
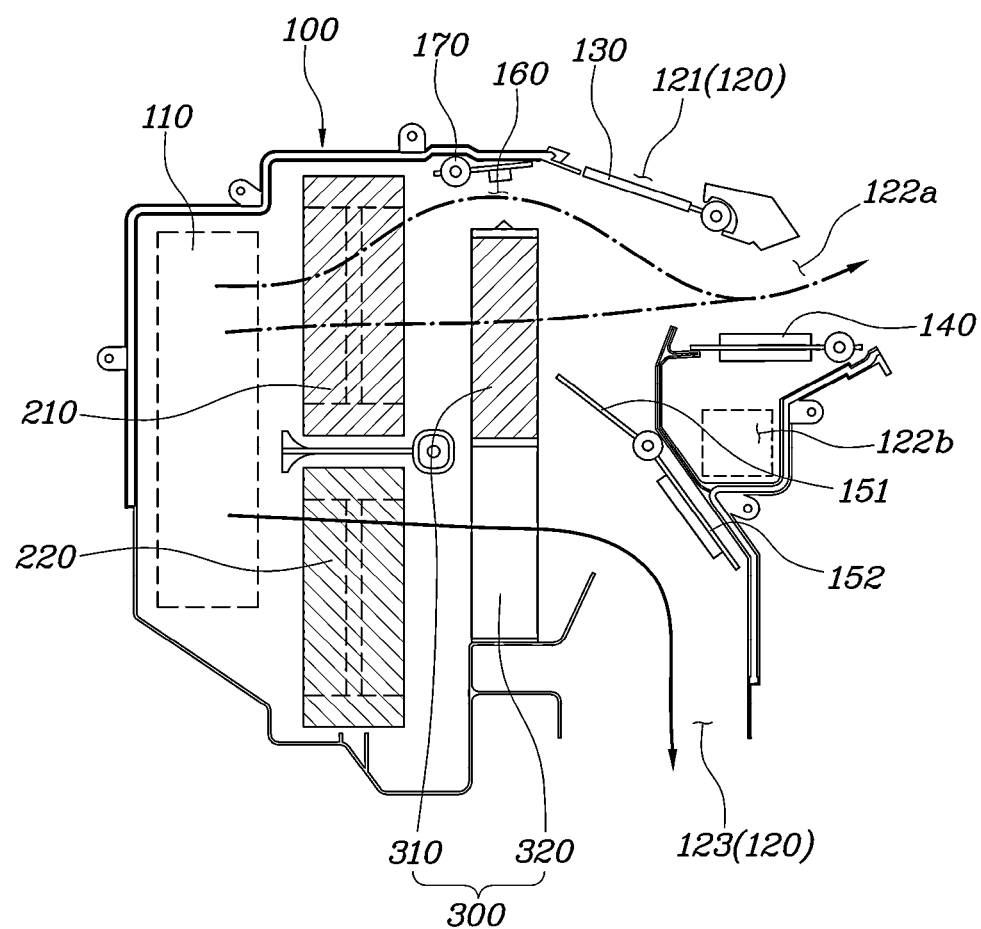
FIG. 12 is a view illustrating the heating in a case of an indoor front space and the cooling in a case of an indoor rear space according to an embodiment of the present disclosure.
Figure 13:
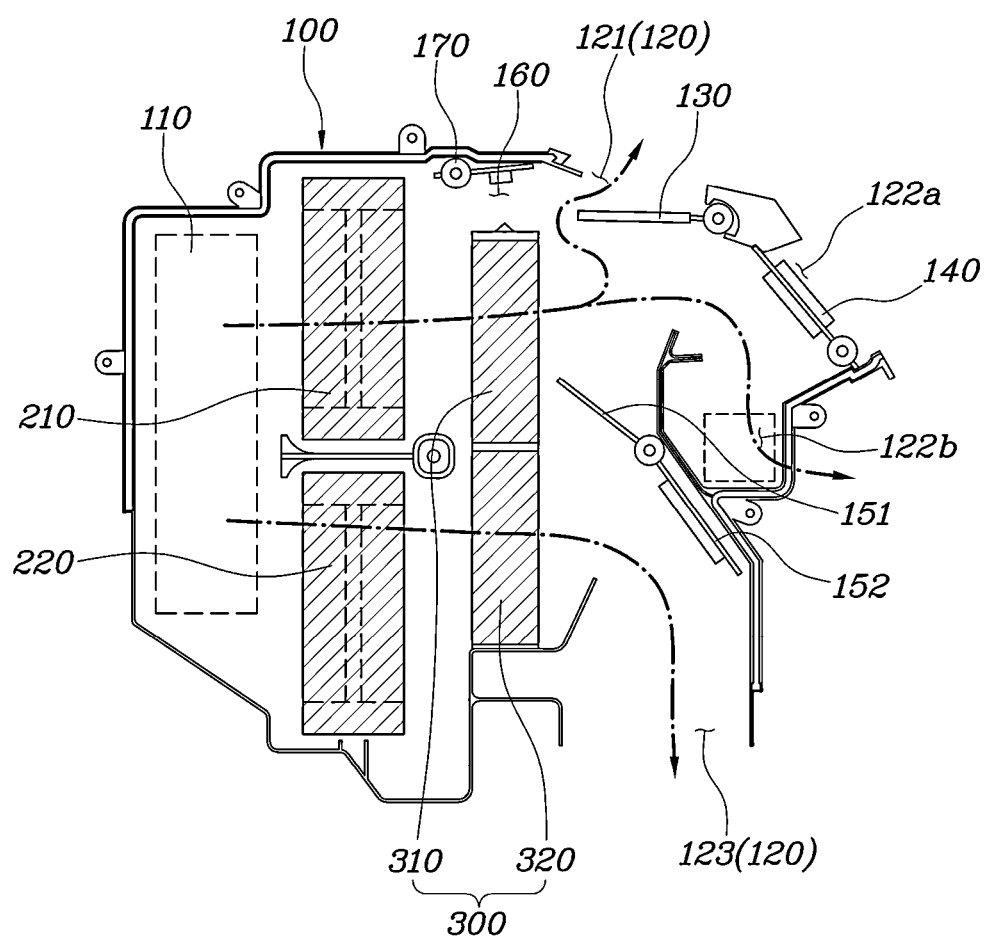
FIG. 13 is a view illustrating the heating of an indoor front space and an indoor rear space according to an embodiment of the present disclosure.
Figure 14:
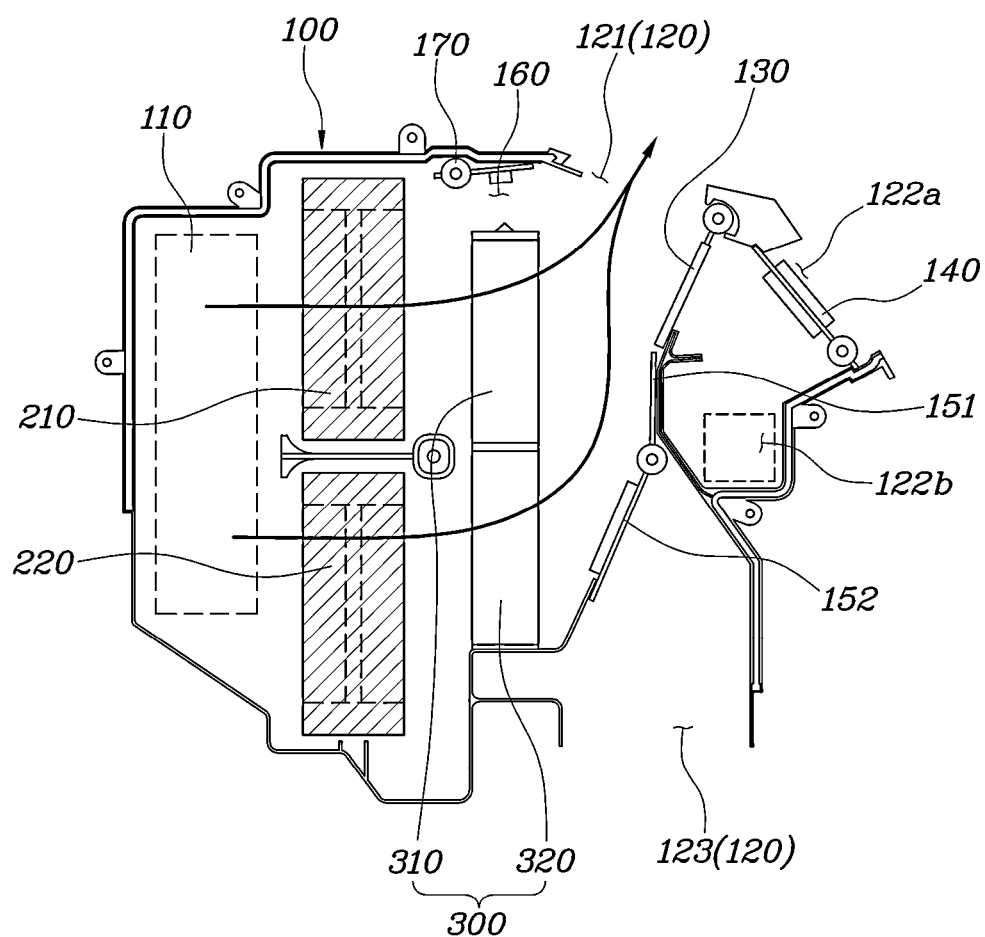
FIG. 14 is a view illustrating the defrosting according to an embodiment of the present disclosure.

FIG. 9 is a view illustrating a configuration of an air-conditioning system of a heat exchanger according to an embodiment of the present disclosure, FIG. 10 is a view illustrating the cooling of an indoor front space and an indoor rear space according to an embodiment of the present disclosure, FIG. 11 is a view illustrating the cooling in a case of an indoor front space and the heating in a case of an indoor rear space according to an embodiment of the present disclosure, FIG. 12 is a view illustrating the heating in a case of an indoor front space and the cooling in a case of an indoor rear space according to an embodiment of the present disclosure, FIG. 13 is a view illustrating the heating of an indoor front space and an indoor rear space according to an embodiment of the present disclosure, and FIG. 14 is a view illustrating the defrosting according to an embodiment of the present disclosure.

As illustrated in FIG. 1, an air-conditioning device of an integrated heat exchanger according to an embodiment of the present disclosure includes: a housing 100 including a plurality of air outlets 120 and an air inlet 110 through which air circulates; an indoor heat exchanger 200 provided inside the housing 100 and including a first heat exchange unit 210 and a second heat exchange unit 220 for heat exchange between a cooling medium and air via the circulation of the cooling medium, the first heat exchange unit 210 and the second heat exchange unit 220 being arranged on upper and lower sides, respectively, of the housing, and configured such that the temperature of the air can be adjusted to the same temperature or different temperatures; and a heater 300 which is arranged inside the housing 100 to be spaced apart from the indoor heat exchanger 200 to increase the temperature of the circulating air according to whether or not it operates.

In this way, in the housing 100, by using the indoor heat exchanger 200 and the heater 300, since the air circulating therein is cooled via the indoor heat exchanger 200 or is heated via the indoor heat exchanger 200 and the heater 300, cooling air or heating air for indoor air conditioning is formed.

In this example, the indoor heat exchanger 200 includes a first heat exchange unit 210 and a second heat exchange unit 220, wherein the temperature of the air circulating in the housing 100 is adjusted according to a cooling medium circulating in the first heat exchange unit 210 and the second heat exchange unit 220. In the case of a cooling medium, it can be cooling water. In an example, when hot cooling water circulates in the first heat exchange unit 210, the air passing through the first heat exchange unit 210 is heated to become heating air. When cold cooling water circulates in the first heat exchange unit 210, the air passing through the first heat exchange unit 210 is cooled to become cooling air. The second heat exchange unit 220 also adjusts the temperature of the conditioned air according to the temperature of the circulating cooling medium in the same manner as the first heat exchange unit 210. Specifically, as the first heat exchange unit 210 and the second heat exchange unit 220 are arranged on the upper and lower sides, respectively, of the housing, the temperature of the air circulating in the housing 100 may be adjusted for each zone corresponding to the first heat exchange unit 210 and the second heat exchange unit 220. Accordingly, since the air which has passed through the first heat exchange unit 210 is circulated in a specific indoor space and the air which has passed through the second heat exchange unit 220 is circulated in another indoor space, different temperature controls for respective sections of the indoor space may be performed.

The heater 300 may be configured as a PTC heater for supplementing heat for heating, which is insufficient only by the indoor heat exchanger 200 at the time of indoor heating.

In addition, the heater 300 may include a first heating unit 310 and a second heating unit 320 which operate individually, wherein the first heating unit 310 is positioned to be matched with the first heat exchange unit 210 and the second heating unit 320 is positioned to be matched with the second heat exchange unit 220.

In this way, the heater 300 includes the first heating unit 310 and the second heating unit 320, wherein the first heating unit 310 and the second heating unit 320 are arranged on the upper and lower sides of the housing such that the first heating unit 310 is matched with the first heat exchange unit 210 and the second heating unit 320 is matched with the second heat exchange unit 220. Therefore, the temperature of the air circulating in the housing 100 may be adjusted for each section corresponding to the first heating unit 310 and the second heating unit 320. Accordingly, by selectively operating the first heating unit 310 and the second heating unit 320 together with the first heat exchange unit 210 and the second heat exchange unit 220, it is possible to satisfy the heating temperature conditions required in the room during indoor heating.

The air outlet 120 of the housing 100 includes at least one defrost vent hole 121 and a front vent hole 122 on the upper side of the housing 100, and at least one rear vent hole 123 on the lower side thereof, wherein the vent holes include a defrost door 130, a front door 140, and a rear door 150, respectively.

In this way, the air which has been introduced into the housing 100 via the air inlet 110 flows into the indoor space through the air outlet 120. In particular, in the case of the air outlet 120, a defrost vent hole 121, a front vent hole 122, and a rear vent hole 123 are provided so that conditioned air may be provided at various positions in the indoor space, and each vent hole may be additionally provided or each vent hole may branch to allow air to flow to various positions in the indoor space.

In this example, the defrost vent hole 121 and the front vent hole 122 are configured on the upper side of the housing 100 so that most of the air which has passed through the first heat exchange unit 210 and the first heating unit 310 circulates. The rear vent hole 123 is configured on the lower side of the housing 100 so that most of the air which has passed through the second heat exchange unit 220 and the second heating unit 320 circulates. In addition, depending on the position of the front door 140 and the rear door 150, the air which has passed through the indoor heat exchanger 200 and the heater 300 selectively flows through the respective vent holes.

Such a defrost vent hole 121 may be configured such that air is discharged toward a front-glass side of the mobility (i.e., vehicle), the front vent hole 122 is configured to discharge air to the front of the interior of the mobility, and the rear vent hole 123 is configured to discharge air to the rear of the interior of the mobility.

In this way, the air flowing in the housing 100 selectively flows into the defrost vent hole 121, the front vent hole 122, or the rear vent hole 123 depending on whether the defrost door 130, the front door 140, or the rear door 150 is opened or closed so that the conditioned air may be provided at a position required in the indoor space.

In this example, the front vent hole 122 is divided into an indoor upper vent hole 122a and an indoor lower vent hole 122b. As the defrost vent hole 121 and the indoor upper vent hole 122a are arranged adjacent to each other in the housing 100, the defrost door 130 may regulate the air flow between the defrost vent hole 121 and the indoor upper vent hole 122a. The front door 140 may regulate the air flow between the indoor upper vent hole 122a and the indoor lower vent hole 122b.

In other words, the indoor upper vent hole 122a may be configured such that air is discharged toward the face of a passenger in the front seat in the indoor front space, and the indoor lower vent hole 122b may be configured such that air is discharged toward the foot of the passenger in the front seat in the indoor front space.

Further, the defrost door 130 may be provided between the defrost vent hole 121 and the indoor upper vent hole 122a so as to selectively regulate the air flow toward the defrost vent hole 121 and the front vent hole 122. The front door 140 may be provided between the indoor upper vent hole 122a and the indoor lower vent hole 122b so as to selectively regulate the air flow toward the indoor upper vent hole 122a and the indoor lower vent hole 122b. The defrost door 130 and the front door 140 may adjust the air flow rate as the degree of opening is adjusted.

In particular, as illustrated in FIGS. 2-4, the front door 140 is configured such that opposite ends thereof are partially cut, and when being positioned to close the indoor upper vent hole 122a, a part of (i.e., some) air may flow through the cut portion.

As shown in FIG. 3, the front door 140 is configured such that a part of opposite ends thereof is cut so that air can circulate to the cut portion. The cut shape of the front door 140 may be applied in various forms, the plurality of front doors 140 may be provided, and the length of the front doors 140 at opposite ends may be configured to be shorter than that of the front door 140 in the center.

As a result, as shown in FIG. 4, even when the front door 140 is positioned to close the indoor upper vent hole 122a, since a small amount of air circulates in the cut portion of the front door 140, the temperature in the indoor front space can be easily controlled and the air conditioning efficiency is ensured. In addition, as shown in FIG. 5, when the front door 140 is positioned to close the indoor lower vent hole 122b, since most of the air flows into the indoor upper vent hole 122a due to the natural flow of the air flow in the housing 100, the air flow rate provided to the passenger in front of the room can be ensured.

As illustrated in FIGS. 6-7, the defrost door 130 is configured such that a part of opposite ends thereof is cut, and when being positioned to close the front vent hole 122 side, a part of air (i.e., some air) may flow through the cut portion.

In this way, the defrost door 130 is cut at a part of opposite ends so that air can circulates to the cut portions. The cut shape of the defrost door 130 may be applied in various forms, and due to the characteristics of the defrost door 130, its size may be determined such that excessive air does not circulate.

Accordingly, as shown in FIG. 8, since a small amount of air passes through the cut portion even when the defrost door 130 is positioned to close the front vent hole 122 side as the defrost vent hole 121 is opened, it is easy to control the temperature of the indoor front space, and the air conditioning efficiency is ensured. In addition, as shown in FIG. 5, when the defrost door 130 is positioned to close the defrost vent hole 121, since most of the air flows into the front vent holes 122 due to the natural flow of the air flow in the housing 100, the air flow rate provided to the passenger in the indoor front space may be ensured.

The rear door 150 is disposed at the rear of the heater 300, and when being positioned to open the rear vent hole 123 side, is configured such that a part of the air which has passed through the heater 300 is guided to the rear vent hole 123 side.

As shown in FIG. 1, the rear door 150 is disposed at the rear of the heater 300 so that the air which has passed through the indoor heat exchanger 200 and the heater 300 is circulated to the rear vent hole 123 side, or the circulation is blocked. In particular, as the rear door 150 is formed in the form of ">", it is configured to have a first flap 151 and a second flap 152. Accordingly, when the rear door 150 is positioned such that air flows toward the rear vent hole 123, the first flap 151 is disposed to be inclined at the rear of the heater 300 to guide a part of the air which has passed through the indoor heat exchanger 200 and the heater 300 to flow toward the rear vent hole 123. In addition, when the rear door 150 is positioned to close the rear vent hole 123, as the second flap 152 blocks the rear vent hole 123, the air which has passed through the indoor heat exchanger 200 and the heater 300 cannot flow into the rear vent hole 123.

A bypass flow path 160 is formed on the upper side of the heater 300 inside the housing 100 so that a part of the air which has passed through the indoor heat exchanger 200 does not pass through the heater 300 through the bypass flow path 160.

As described above, since the bypass flow path 160 is formed on the upper side of the heater 300 inside the housing 100, the flow resistance due to the heater 300 being disposed inside the housing 100 is eliminated. In other words, as a part of the air which has passed through the indoor heat exchanger 200 in the housing 100 flows through the bypass flow path 160 without passing through the heater 300, the pressure in the housing 100 is reduced and the flow stream can be improved.

In addition, in the housing 100, a bypass door 170 is installed at the bypass flow path 160, and air flow through the bypass flow path 160 is selectively allowed depending on whether the bypass door 170 is opened or closed. As described above, since the bypass door 170 is installed at the bypass flow path 160, it is possible to secure the air flow rate and the air conditioning efficiency according to the indoor heating/cooling conditions.

In other words, the bypass door 170 may be closed when the heating air is formed through the indoor heat exchanger 200, and may be opened when the cooling air is formed through the indoor heat exchanger 200.

As described above, since the bypass door 170 is closed when providing heating air to the room, as all of the heating air which has passed through the indoor heat exchanger 200 passes through the heater 300, the heat exchange area between the heater 300 and the air increases so that the heating air can be efficiently formed. Further, the bypass door 170 is opened when providing the cooling air to the room, as the cooling air which has passed through the indoor heat exchanger 200 does not pass through the heater 300 via the bypass flow path 160, the flowability of the air flow is improved so that the pressure in the housing 100 is lowered and the flow rate of the cooling air is increased.

As described above, according to the present disclosure, the degree of opening of each door is adjusted according to various modes required in the room, via executing a vent mode, a bi-level mode, a floor mode, a mix mode, a defrost mode, and the like, the conditioned air can be provided at a desired position and a desired temperature in the indoor space.

As illustrated in FIG. 9, the air-conditioning system of the integrated heat exchanger according to the present disclosure includes: a refrigerant circuit 10 through which a refrigerant circulates and which includes a compressor 11, a condenser 12, an expander 13, and an evaporator 14; a first cooling water circuit 20 in which cooling water for heating, which exchanges heat with the condenser 12 of the refrigerant circuit 10, circulates; a second cooling water circuit 30 in which cooling water for cooling, which exchanges heat with the evaporator 14 of the refrigerant circuit 10, circulates; an indoor heat exchanger 200 provided inside the housing 100 and including a first heat exchange unit 210 and a second heat exchange unit 220 to which the first cooling water circuit 20 and the second cooling water circuit 30 are connected so that the cooling water for heating and the cooling water for cooling are selectively circulated, wherein the first heat exchange unit 210 and the second heat exchange unit 220 are arranged on the upper and lower sides, respectively, of the housing 100, and the same cooling water or different cooling waters circulates in the first heat exchange unit 210 and the second heat exchange unit 220 so that the temperature of the air is adjusted separately for the first heat exchange unit 210 and the second heat exchange unit 220; and a valve module 40 to which the first cooling water circuit 20 and the second cooling water circuit 30 are connected and which selectively regulates the cooling water for heating or the cooling water for cooling which circulates to the indoor heat exchanger 200.

The first cooling water circuit 20 may include a first water pump 21 and an outdoor heat exchanger 22, and the second cooling water circuit 30 may include a second water pump 31. The outdoor heat exchanger 22 may be configured as a radiator, and the first water pump 21, the second water pump 31, the compressor 11, the expander 13, and various types of valves may be controlled by a controller 50.

According to an embodiment of the present disclosure, the refrigerant circuit 10 includes a compressor 11, a condenser 12, an expander 13, and an evaporator 14, and the refrigerant is sequentially circulated in the compressor 11, the condenser 12, the expander 13, and the evaporator 14.

In this example, in the refrigerant circuit 10, as the high-temperature and high-pressure refrigerant compressed by the compressor 11 flows into the condenser 12, the cooling water circulating in the first cooling water circuit 20 connected to the condenser 12 is heated by the heat generated by the condenser 12. Accordingly, the first cooling water circuit 20 includes the condenser 12, and the cooling water exchanges heat with the refrigerant via the condenser 12 and circulates as the cooling water for heating.

In addition, in the refrigerant circuit 10, the cooling water circulating in the second cooling water circuit connected to the evaporator 14 is cooled by the endothermic action via the evaporator 14. Therefore, the second cooling water circuit 30 includes the evaporator 14. The cooling water exchanges heat with the refrigerant via the evaporator 14 and is circulated as cooling water for cooling.

In this way, respective cooling water circulating in the first cooling water circuit 20 and the second cooling water circuit 30 exchange heat via the condenser 12 and the evaporator 14, and the first cooling water circuit 20 and the second cooling water circuit 30 are connected to the indoor heat exchanger 200 provided inside the air conditioner such that the cooling water circulates, so that the cooling water is heat-exchanged with the conditioned air via the indoor heat exchanger 200. As the first water pump 21 is provided in the first cooling water circuit 20, the cooling water may be circulated in the first cooling water circuit 20. As the second water pump 31 is provided in the second cooling water circuit 30, the cooling water may be circulated in the second cooling water circuit 30.

In particular, since the valve module 40 is connected to the first cooling water circuit 20 and the second cooling water circuit 30, the cooling water for heating or the cooling water for cooling circulated in the indoor heat exchanger 200 may be selectively regulated and circulated to the first heat exchange unit 210 and the second heat exchange unit 220 of the indoor heat exchanger 200. In other words, by the valve module 40, the cooling water for heating which is circulated in the first cooling water circuit 20 may be circulated in the first heat exchange unit 210 or the second heat exchange unit 220, and the cooling water for cooling which is circulated in the second cooling water circuit 30 may be circulated in the first heat exchange unit 210 or the second heat exchange unit 220. In this example, the valve module is a multi-way valve, and a plurality of 4-way valves may be configured to be modularized.

Therefore, in the present disclosure, the temperature of the cooling water circulating in the first cooling water circuit 20 and the second cooling water circuit 30 is adjusted through the circulation of the refrigerant in the refrigerant circuit 10. Since the cooling water circulating through the first cooling water circuit 20 and the second cooling water circuit 30 is circulated by the valve module 40 to the first heat exchange unit 210 and the second heat exchange unit 220 of the indoor heat exchanger 200, it is possible to provide conditioned air according to the temperature required in the room via the indoor heat exchanger 200. In addition, as the temperature of the cooling water is adjusted by circulating the refrigerant, and the cooling water is used to form heating air or cooling air in the air conditioner, each configuration of the refrigerant circuit 10 may be simplified and the package corresponding to the refrigerant circulation may be reduced (i.e., reduced size, number of components, weight, and the like). Further, since cooling water having different temperatures circulating in the first cooling water circuit and the second cooling water circuit 30 flows into one indoor heat exchanger 200 to adjust the temperature of the conditioned air, the selective circulation of cooling water by the valve module 40 allows the temperature of the conditioned air to be adjusted without a temperature control door.

As described above, in the present disclosure, the cooling water may be heated by the condenser 12 and cooled by the outdoor heat exchanger 22 while being circulated by the operation of the first water pump 21 in the first cooling water circuit 20, so that the temperature of the cooling water may be controlled. In addition, the cooling water may be cooled by the evaporator 14 while being circulated by the operation of the second water pump 31 in the second cooling water circuit 30.

In addition, the first cooling water circuit 20 and the second cooling water circuit 30 may selectively share each cooling water via a plurality of shared valves V. The shared valves V may be respectively provided at the front end and the rear end of the condenser 12 in the first cooling water circuit 20, and at the front end and the rear end of the evaporator 14 in the second cooling water circuit 30. The shared valve V provided in the first cooling water circuit and the shared valve V provided in the second cooling water circuit 30 may be connected via a shared line L. Accordingly, in the first cooling water circuit 20 and the second cooling water circuit 30, depending on whether or not the shared valve V operates, cooling water may be circulated separately in the first cooling water circuit 20 and the second cooling water circuit 30, or the cooling water circulating in the first cooling water circuit 20 and the second cooling water circuit 30 may be shared. Accordingly, it is easy to adjust the temperature of the cooling water to meet the temperature required for indoor air conditioning, and the cooling water may be efficiently used according to the driving situations and the surrounding environment.

Therefore, the difference between the conventional and the present disclosure is that, in the conventional case, in the air conditioner, the condenser for forming the heating air and the evaporator for forming the cooling air must be arranged to be spaced apart from each other, and it is difficult to form heating air because the condenser must be relatively smaller. However, in one embodiment according to the present disclosure, as the indoor heat exchanger 200 is singly disposed in the air conditioner, the entire package (size, number of components, and the like) of the air conditioner is reduced and the temperature control door is removed so that the number of components and the weight thereof are reduced. Further, as the indoor heat exchanger 200 exchanges heat with the conditioned air in the entire area regardless of the formation of the heating air and the cooling air, all the cooling and heating performances are ensured.

The air outlet 120 of the housing 100 includes at least one defrost vent hole 121 and a front vent hole 122 on the upper side of the housing 100, and at least one rear vent hole 123 on the lower side thereof, wherein the vent holes include a defrost door 130, a front door 140, and a rear door 150, respectively.

In addition, in the housing 100, a bypass flow path 160 is provided in the upper side of the heater 300, and a bypass door 170 is installed at the bypass flow path 160.

As a result, the air conditioner is optimized for the heating/cooling conditions and each air conditioning mode so that the air flow rate can be ensured, and the air conditioning efficiency can be improved.

A valve module 40 and a controller 50 for controlling each door are further provided according to the temperature conditions required in the indoor space. The controller 50 may control the valve module 40 and each door according to not only the temperature condition but also various modes so that the conditioned air in the indoor space can satisfy desired position and temperature.

In particular, the control unit 50 may allow the cooling water for cooling circulating in the second cooling water circuit 30 to circulate to the first heat exchange unit 210 and the second heat exchange unit 220 when the indoor front space and the indoor rear space are cooled, and control the valve module 40 and each door so that the front door 140, the rear door 150, and the bypass door 170 are opened.

As illustrated in FIG. 10, when the indoor front space and the indoor rear space are cooled, the cooling water for cooling of the second cooling water circuit 30 is circulated to both the first heat exchange unit 210 and the second heat exchange unit 220 of the indoor heat exchanger 200, and as the heater 300 does not operate, cooling air may be formed inside the housing 100 so that the cooling air may be provided in the front and rear of the indoor space via the front vent hole 122 and the rear vent hole 123. Further, since the bypass door 170 is opened inside the housing 100, a part of the air flows through the bypass flow path 160, so that the air flow rate is ensured and the pressure inside the air conditioner is reduced.

When cooling the indoor front space and heating the indoor rear space, the controller 50 controls the valve module 40 and each door so that the cooling water for heating of the first cooling water circuit 20 circulates to the second heat exchange unit 220, the cooling water for cooling of the second cooling water circuit 30 circulates to the first heat exchanger, and the front door 140, the rear door 150, and the bypass door 170 are opened.

As illustrated in FIG. 11, in order to cool the indoor front space, the cooling water for cooling of the second cooling water circuit 30 is circulated to the first heat exchange unit 210, and the air passing through the first heat exchange unit 210 is cooled in the housing 100 to form cooling air. The cooling air is provided in the indoor front space via the front vent hole 122. Further, as the bypass door 170 is opened, since a part of the air which has passed through the first heat exchange unit 210 circulates in the bypass flow path 160, the flow rate of the cooling air which circulates in the indoor front space increases.

In addition, in order to heat the indoor rear space, the cooling water for heating of the first cooling water circuit 20 is circulated to the second heat exchange unit 220 so that the air passing through the second heat exchange unit 220 is heated in the housing 100 to form the heating air. The heating air is provided in the indoor rear space via the rear vent hole 123.

Cooling water circulating in the first cooling water circuit 20 and the second cooling water circuit 30 may be respectively circulated to the second heat exchange unit 220 and the first heat exchange unit 210 by the valve module 40. It is possible to provide the conditioned air to the indoor space for each mode via adjusting the amount of opening of each door.

Further, in one embodiment according to the present disclosure, as the heater 300 includes the first heating unit 310 and the second heating unit 320, the second heating unit 320 which is matched with the second heat exchange unit 220 is operated so that the heat for heating can be supplemented.

When heating the indoor front space and cooling the indoor rear space, the controller may control the valve module 40 and each door so that the cooling water for heating of the first cooling water circuit 20 circulates to the first heat exchange unit 210, the cooling water for cooling of the second cooling water circuit 30 circulates to the second heat exchanger, and the front door 140, the rear door 150, and the bypass door 170 are opened.

As illustrated in FIG. 12, in order to heat the indoor front space, the cooling water for heating of the first cooling water circuit 20 is circulated to the first heat exchange unit 210, and the air passing through the first heat exchange unit 210 is heated in the housing 100 to form the heating air. The heating air is provided in the indoor front space via the front vent hole 122. Further, as the bypass door 170 is opened, since a part of the air which has passed through the first heat exchange unit 210 circulates in the bypass flow path 160, the flow rate of the heating air which circulates in the indoor front space increases.

In addition, in order to cool the indoor rear space, the cooling water for cooling of the second cooling water circuit 30 is circulated to the second heat exchange unit 220, and the air passing through the second heat exchange unit 220 is cooled in the housing 100 to form cooling air. The cooling air is provided in the indoor rear space via the rear vent hole 123.

Each cooling water circulating in the first cooling water circuit 20 and the second cooling water circuit 30 may be respectively circulated to the first heat exchange unit 210 and the second heat exchange unit 220 by the valve module 40. It is possible to provide the conditioned air to the indoor space for each mode via adjusting the amount of opening of each door.

Further, in one embodiment according to the present disclosure, as the heater 300 includes the first heating unit 310 and the second heating unit 320, the first heating unit 310 which is matched with the first heat exchange unit 210 is operated so that the heat for heating can be supplemented.

When heating the indoor front space and the indoor rear space, the controller may control the valve module 40 and each door so that the cooling water for heating circulates in the first cooling water circuit 20 circulates to the first heat exchange unit 210 and the second heat exchange unit 220, the heater 300 is selectively operated, and the front door 140 and the rear door 150 are opened and the bypass door 170 is closed.

As illustrated in FIG. 13, when heating the indoor front space and the indoor rear space, the cooling water for heating of the first cooling water circuit 20 may be circulated to both the first heat exchange unit 210 and the second heat exchange unit 220 of the indoor heat exchanger 200 to form heating air, so that the heating air is provided to the front and rear of the indoor space through the front vent hole 122 and the rear vent hole 123. In this case, the heater 300 may be selectively operated to adjust the temperature of the heating air. Further, since the bypass door 170 is closed inside the housing 100, the heating efficiency is ensured as all the air which has passed through the indoor heat exchanger 200 passes through the heater 300.

When defrosting, the controller 50 may control the valve module 40 and each door so that the cooling water for heating which circulates in the first cooling water circuit circulates to the first heat exchange unit 210 and the second heat exchange unit 220, the heater 300 is selectively operated, the defrost door 130 is opened, and the front door 140, the rear door, and the bypass door 170 are closed.

As illustrated in FIG. 14, when defrosting, the cooling water for heating of the first cooling water circuit is circulated to both the first heat exchange unit 210 and the second heat exchange unit 220 of the indoor heat exchanger 200 to form heating air, and as the defrost door 130 is opened, the heating air circulates to the defrost vent hole 121. Further, as the front door 140 and the rear door 150 are closed, since the air which has passed through the indoor heat exchanger 200 and the heater 300 circulates to the defrost vent hole 121 to secure the air flow rate, frost can be removed quickly. Further, since the bypass door 170 is closed inside the housing 100, the efficiency of providing the heating air for defrosting is improved as all the air which has passed through the indoor heat exchanger 200 passes through the heater 300.

The air-conditioning device and system of the integrated heat exchanger having the structure described above utilize cooling water as an integrated heat exchanger for generating heating air or cooling air to generate conditioning air so that cooling and heating efficiency is ensured, so that the number of doors for adjusting the temperature of the conditioning air for each mode is reduced, and so that the entire package (size, number of components, weight, and the like) is reduced. In addition, it is possible to individually control the temperature of the front space and the rear space of the room so that it is possible to provide comfort for each passenger seat.

Although the present disclosure has been described and illustrated in conjunction with particular embodiments thereof, it should be apparent to those having ordinary skill in the art that various improvements and modifications may be made to the present disclosure without departing from the technical idea of the present disclosure defined by the appended claims.

What is claimed is:

1. An air-conditioning device of an integrated heat exchanger, the air-conditioning device comprising:
   a housing including a plurality of air outlets and an air inlet through which air circulates;
   an indoor heat exchanger provided inside the housing and including a first heat exchange unit and a second heat exchange unit for heat exchange between a cooling medium and air via circulation of the cooling medium, the first heat exchange unit and the second heat exchange unit being arranged on upper and lower sides, respectively, of the housing, and configured such that a temperature of the air can be adjusted to an identical temperature or different temperatures; and
   a heater arranged inside the housing to be spaced apart from the indoor heat exchanger to increase the temperature of the circulating air according to whether or not the heater operates,
   wherein the air outlets of the housing include at least one defrost vent hole and a front vent hole on the upper side of the housing, and at least one rear vent hole on the lower side thereof, wherein the vent holes include a defrost door, a front door, and a rear door,
   wherein the defrost door is configured such that opposite ends thereof are partially cut, and when being positioned to close a front vent hole side, some air flows through the cut portion.

2. The air-conditioning device of an integrated heat exchanger of claim 1,
   wherein the front vent hole is divided into an indoor upper vent hole and an indoor lower vent hole, and the defrost door regulates the air flow between the defrost vent hole and the indoor upper vent hole such that the defrost vent hole and the indoor upper vent hole are arranged adjacent to each other in the housing, and wherein the front door regulates the air flow between the indoor upper vent hole and the indoor lower vent hole.

3. The air-conditioning device of an integrated heat exchanger of claim 2, wherein the front door is configured such that opposite ends thereof are partially cut, and when being positioned to close the indoor upper vent hole, some air flows through the cut portion.

4. The air-conditioning device of an integrated heat exchanger of claim 1, wherein the rear door is disposed at a rear of the heater, and when being positioned to open a rear vent hole side, is configured such that a part of the air which has passed through the heater is guided to the rear vent hole side.

5. The air-conditioning device of an integrated heat exchanger of claim 1, wherein a bypass flow path is formed on an upper side of the heater in the housing so that a part of the air which has passed through the indoor heat exchanger does not pass through the heater through the bypass flow path.

6. The air-conditioning device of an integrated heat exchanger of claim 5, wherein a bypass door is installed at the bypass flow path in the housing, and air flow through the bypass flow path is selectively allowed depending on whether the bypass door is opened or closed.

7. The air-conditioning device of an integrated heat exchanger of claim 6, wherein the bypass door is closed when forming heating air via the indoor heat exchanger, is opened when forming cooling air via the indoor heat exchanger, and is closed when the defrost vent hole and the front vent hole are closed and the rear vent hole is opened.

8. The air-conditioning device of an integrated heat exchanger of claim 1, wherein the heater includes a first heating unit and a second heating unit which operate individually, and the first heating unit is positioned to be matched with the first heat exchange unit and the second heating unit is positioned to be matched with the second heat exchange unit.

9. An air-conditioning device of an integrated heat exchanger, the air-conditioning device comprising:
   a housing including a plurality of air outlets and an air inlet through which air circulates;
   an indoor heat exchanger provided inside the housing and including a first heat exchange unit and a second heat exchange unit for heat exchange between a cooling medium and air via circulation of the cooling medium, the first heat exchange unit and the second heat exchange unit being arranged on upper and lower sides, respectively, of the housing, and configured such that a temperature of the air can be adjusted to an identical temperature or different temperatures; and
   a heater arranged inside the housing to be spaced apart from the indoor heat exchanger to increase the temperature of the circulating air according to whether or not the heater operates,
   wherein the air outlets of the housing include at least one defrost vent hole and a front vent hole on the upper side of the housing, and at least one rear vent hole on the lower side thereof, wherein the vent holes include a defrost door, a front door, and a rear door,
   wherein the front vent hole is divided into an indoor upper vent hole and an indoor lower vent hole, and wherein the front door is configured such that opposite ends thereof are partially cut, and when being positioned to close the indoor upper vent hole, some air flows through the cut portion.

* * * * *